US011066079B2

(12) United States Patent
Gazda et al.

(10) Patent No.: US 11,066,079 B2
(45) Date of Patent: Jul. 20, 2021

(54) EXPANDING CRUISE CONTROL ENABLE CRITERIA

(71) Applicant: GM GLOBAL TECHNOLOGY OPERATIONS LLC, Detroit, MI (US)

(72) Inventors: Mark Gazda, Howell, MI (US); Kelvin Chen Chih Peng, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 174 days.

(21) Appl. No.: 16/359,518

(22) Filed: Mar. 20, 2019

(65) Prior Publication Data

US 2020/0298867 A1 Sep. 24, 2020

(51) Int. Cl.
*B60W 50/00* (2006.01)
*B60W 30/14* (2006.01)

(52) U.S. Cl.
CPC .......... *B60W 50/00* (2013.01); *B60W 30/143* (2013.01); *B60W 2050/0082* (2013.01); *B60W 2540/18* (2013.01); *B60W 2554/00* (2020.02); *B60W 2720/10* (2013.01)

(58) Field of Classification Search
CPC ............... B60W 50/00; B60W 30/143; B60W 2554/00; B60W 2050/0082; B60W 2540/18; B60W 2720/10; B60W 50/082; B60W 2510/20; B60W 60/0059; B60W 2552/53; B60W 30/12; B60W 30/14; B60W 10/04; B60W 10/10; B60W 10/20; B60W 10/18; B60W 40/06; B60W 2710/06; B60W 2710/08; B60W 2710/1005; B60W 2710/18; B60W 2710/20
See application file for complete search history.

(56) References Cited

U.S. PATENT DOCUMENTS

2007/0233343 A1* 10/2007 Saito .................... B62D 15/025 701/41
2012/0283913 A1* 11/2012 Lee ...................... B62D 15/025 701/41

* cited by examiner

*Primary Examiner* — Brian P Sweeney
(74) *Attorney, Agent, or Firm* — Cantor Colburn LLP

(57) ABSTRACT

A vehicle, system for operating the vehicle and method of activating a control system is disclosed. The system includes a sensor for detecting lane markings of a driving lane, a road wheel angle sensor configured to measure a road wheel angle of the vehicle, and a processor. The processor is configured to determine a distance of the vehicle from a central line of a driving lane form the detected lane markings, adjust an angular threshold for activation of the control system of the vehicle based on the determined distance, and activate the control system when the road wheel angle is within the angular threshold.

20 Claims, 4 Drawing Sheets

500
502 Determine a distance of the vehicle from a central line of a driving lane
504 Adjust an angular threshold for activation of the feature based on the determined distance
506 Measure a road wheel angle of the vehicle
508 Activate the cruise control system when the road wheel angle is within the angular threshold

EXPANDING CRUISE CONTROL ENABLE CRITERIA

INTRODUCTION

The subject disclosure relates to cruise control system of a vehicle and, in particular, to a system and method for activating the cruise control system.

Many vehicle include a cruise control driving system that allows the driver to remove hands from the steering wheel so that the vehicle drives autonomously. In order to activate this system, the vehicle has to be placed in a certain condition with respect to the road. For example, the location of the vehicle and heading or orientation of the vehicle have to meet selected criteria with respect to a driving lane in order for the system to be activated. When the criteria are overly strict, the driver can find it difficult to place the vehicle in the right state in order to engage the system. Accordingly, it is desirable to provide a method of activating a cruise control system of a vehicle that is flexible to the driver's situation.

SUMMARY

In one exemplary embodiment, a method of activating a control system of a vehicle is disclosed. A distance of the vehicle from a central line of a driving lane is determined. An angular threshold for activation of the control system is adjusted based on the determined distance. A road wheel angle of the vehicle is measured. The control system is activated when the road wheel angle is within the angular threshold.

In addition to one or more of the features described herein, the angular threshold is one of a left side angular threshold and a right side angular threshold. Adjusting the angular threshold further comprises increasing the one of the left side angular threshold and right side angular threshold that is closest to the central line. The left side angular threshold is increased when the vehicle is to a right side of the central line, and the right side angular threshold is increased when the vehicle is to a left side of the central line. The angular threshold is increased in proportion to a distance of the vehicle from the central line. The road wheel angle is related to a trajectory of the vehicle. In various embodiments, the control system is a cruise control system of the vehicle.

In another exemplary embodiment, a system for operating a vehicle is disclosed. The system includes a sensor for detecting lane markings of a driving lane, a road wheel angle sensor configured to measure a road wheel angle of the vehicle, and a processor. The processor is configured to determine a distance of the vehicle from a central line of a driving lane from the detected lane markings, adjust an angular threshold for activation of the control system of the vehicle based on the determined distance, and activate the control system when the road wheel angle is within the angular threshold.

In addition to one or more of the features described herein, the angular threshold is one of a left side angular threshold and a right side angular threshold. The processor is further configured to adjust the angular threshold by increasing the one of the left side angular threshold and right side angular threshold that is closest to the central line. The processor is further configured to increase the left side angular threshold when the vehicle is to a right side of the central line and increasing the right side angular threshold when the vehicle is to a left side of the central line. The processor is further configured to increase the angular threshold in proportion to a distance of the vehicle from the central line. The road wheel angle is related to a trajectory of the vehicle. In various embodiments, the control system is a cruise control system of the vehicle.

In another exemplary embodiment, a vehicle is disclosed. The vehicle includes a sensor for detecting lane markings of a driving lane, a road wheel angle sensor configured to measure a road wheel angle of the vehicle, a cruise control system, and a processor. The processor is configured to determine a distance of the vehicle from a central line of a driving lane form the detected lane markings, adjust an angular threshold for activating the cruise control system based on the determined distance, and activate the cruise control system when the road wheel angle is within the angular threshold.

In addition to one or more of the features described herein, the angular threshold is one of a left side angular threshold and a right side angular threshold. The processor is further configured to adjust the angular threshold by increasing the one of the left side angular threshold and right side angular threshold that is closest to the central line. The processor is further configured to increase the left side angular threshold when the vehicle is to a right side of the central line and increasing the right side angular threshold when the vehicle is to a left side of the central line. The processor is further configured to increase the angular threshold in proportion to a distance of the vehicle from the central line. The road wheel angle is related to a trajectory of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
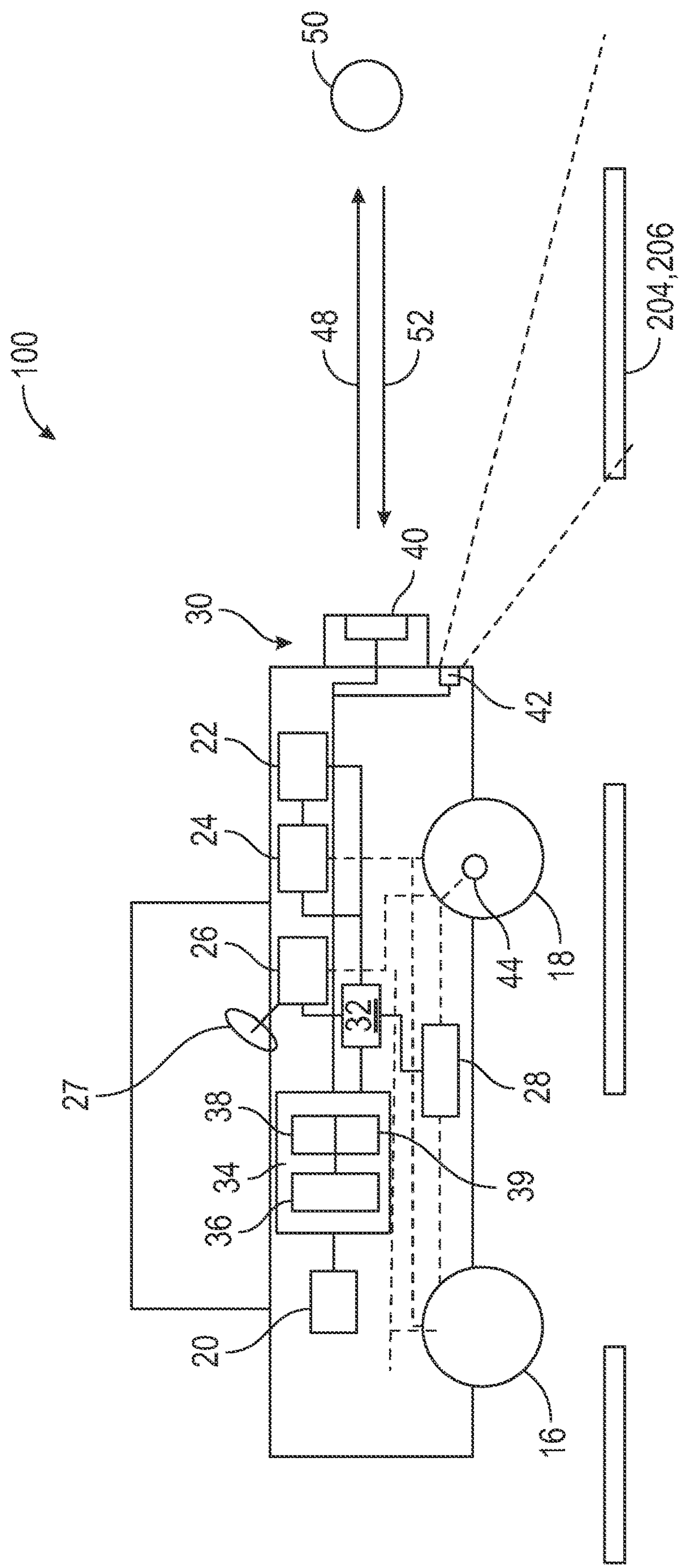
FIG. 1 shows an autonomous vehicle embodying a feature of the disclosure.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10. In an exemplary embodiment, the autonomous vehicle 100 is a so-called Level Four or Level Five automation system. A Level Four system indicates "high automation", referring to the driving modespecific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

The autonomous vehicle 100 generally includes at least a navigation system 20, a propulsion system 22, a transmission system 24, a steering system 26, a brake system 28, a sensor system 30, an actuator system 32, and a controller 34. The navigation system 20 determines a trajectory plan for automated driving of the autonomous vehicle 10. The propulsion system 22 provides power for creating a motive force for the autonomous vehicle 100 and may, in various embodiments, include an internal combustion engine, an electric machine such as a traction motor, and/or a fuel cell propulsion system. The transmission system 24 is configured to transmit power from the propulsion system 22 to wheels 16 and 18 of the autonomous vehicle 100 according to selectable speed ratios. The steering system 26 influences a position of the wheels 16 and 18. The steering system 26 can further include a road wheel angle sensor 44 for measuring and determining the angular deviation of wheels 16 and 18 with respect to "straight ahead" or a longitudinal axis of the vehicle 100. While depicted as including a steering wheel 27 for illustrative purposes, in some embodiments contemplated within the scope of the present disclosure, the steering system 26 may not include a steering wheel 27. The brake system 28 is configured to provide braking torque to the wheels 16 and 18.

The sensor system 30 includes a Lidar system 40 that senses targets in an exterior environment of the autonomous vehicle 100 and provides a depth image of the environment. In operation, the Lidar system 40 sends out a source pulse of light 48 that is reflected back at the autonomous vehicle 100 by one or more targets 50, in the field of view of the Lidar system 40, as a reflected pulse 52. Sensor system 30 further includes a lane detection system 42 that locates one or more lane markings 204, 206 along the road.

The actuator system 32 includes one or more actuators that control one or more vehicle systems such as, but not limited to, the propulsion system 20, the transmission system 22, the steering system 24, and the brake system 26.

The controller 34 includes a processor 36 and a computer readable storage device or media 38. The computer readable storage medium includes programs or instructions 39 that, when executed by the processor 36, operate the Lidar system 40 in order to obtain data such as location and depth data of a target 50. The computer readable storage medium 38 may further include programs or instructions 39 that when executed by the processor 36, operate the navigation system 20 and/or the actuator system 32 according to data obtained from the Lidar system 40 in order to navigate the autonomous vehicle 100 with respect to the target 50.

In various embodiments the controller 34 operates the Lidar system 40 in order to determine a parameter such as angular location and depth of the target 50 from reflected pulse 52. These parameters can be used either alone or in combination with other parameters (e.g., Doppler) to obtain a predictive map of the environment for navigational purposes. The navigation system 20 builds a trajectory for the autonomous vehicle 100 based on data from the Lidar system 40 and any other parameters. The controller 34 can provide the trajectory to the actuator 32 to control the propulsion system 20, transmission system 22, steering system 24 and/or brake 26 in order to navigate the vehicle 100 with respect to the target 50.

In various embodiments, the controller 34 operates the various systems (i.e., navigation system 20, propulsion system 22, transmission system 24, steering system 26, brake system 28, sensor system 30, actuator system 32, etc.) in order to perform a cruise control system to drive the vehicle 100 autonomously. The cruise control system can be activated by placing the vehicle 100 in a selected state with respect to the driving lane.

The controller 34 can operate the lane detection system 42 to locate one or more lane markings 204, 206 along the road and to determine a distance between the vehicle and the one or more lane markings 204, 206 and to activate a control system of the vehicle 10, such as the cruise control system, based on this distance and a road wheel angle. The controller 34 can determine this distance based on a distance between a longitudinal axis of the vehicle and a lane marking. Such distance can be used to adjust a threshold or criterion involved in activating a control system of the vehicle, such as the cruise control system, as explained below.

The present disclosure provides a method for determining if operating conditions of a vehicle are stable enough to enable a system of the vehicle such as a cruise control system. The present disclosure adjusts an angular threshold for activation of the system as a function of the vehicle's location relative to a center of a lane in which the vehicle resides. Allowing the angular threshold to change allows flexibility for the driver to engage the system.

Figure 2C:
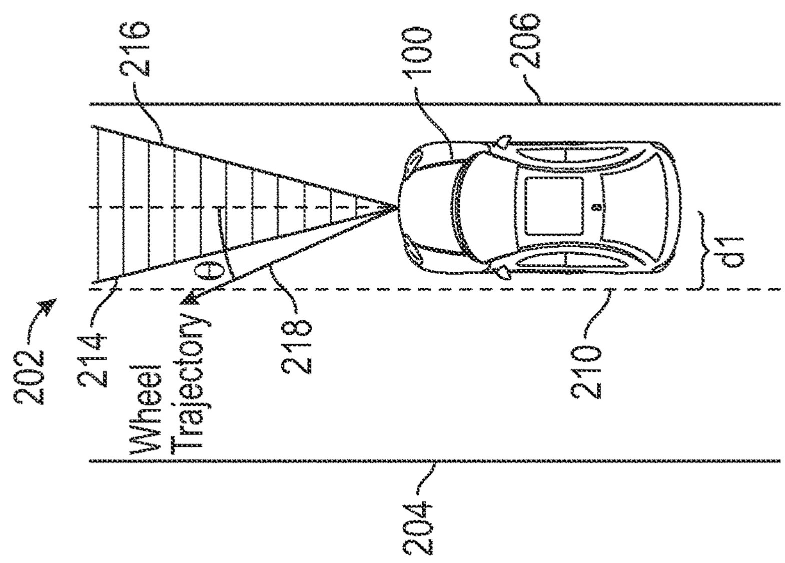
FIGS. 2A-2C illustrate the vehicle of FIG. 1 at three different locations within a driving lane and the effects of these locations on the ability to activate a cruise control system of the vehicle.
Figure 2B:
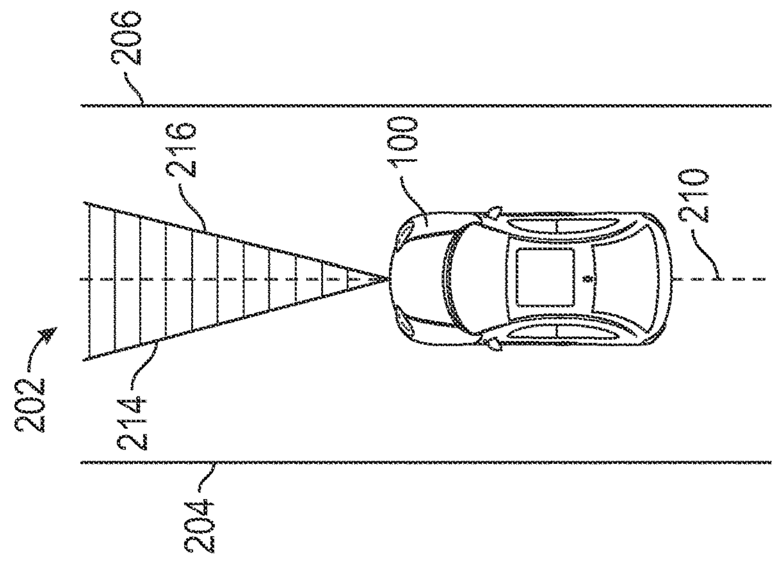
Figure 2A:
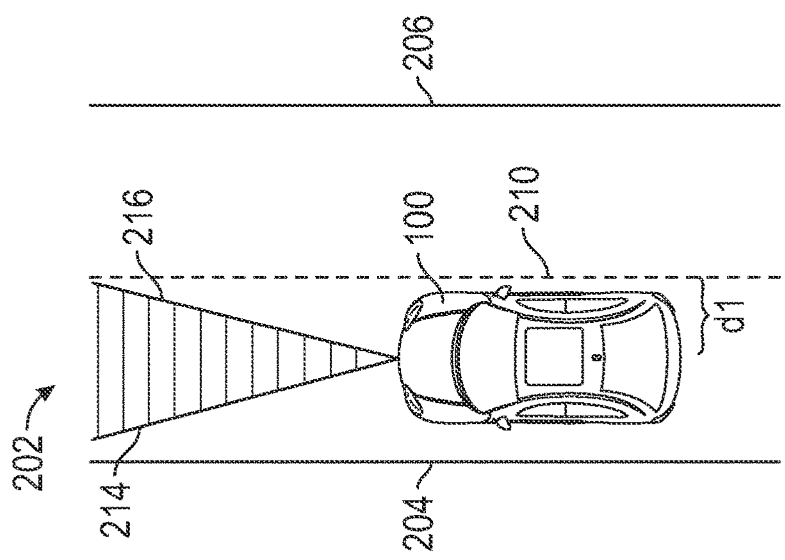

FIGS. 2A, 2B and 2C illustrates a vehicle 100 at three different locations within a driving lane 202 and the effects of these locations on the ability to activate a cruise control system. FIG. 2A illustrates an "on the left" driving scenario in which the vehicle is to a left side of a central line 210 of a driving lane 202. FIG. 2B illustrates a "centered" driving scenario in which the vehicle is driving along the central line 210 of the driving lane 202. FIG. 2C illustrates an "on the right" driving scenario in which the vehicle is to a right side of the central line 210 of the driving lane 202.

Referring first to the centered driving scenario of FIG. 2B, the vehicle 100 is within a lane 202 having a left lane marker 204 and a right lane marker 206. The vehicle 100 is centered within the lane 202, driving along a central line 210 halfway between the left lane marker 204 and the right lane marker 206. The road wheel angle is zero degrees or straight ahead. The road wheel angle is an angle between the direction of a wheel of the vehicle 100 and a longitudinal axis of the vehicle 10. The vehicle can activate the cruise control system when the vehicle is in this optimal condition (i.e., centered along central line 210 and with a road wheel angle at zero degrees to the central line 210).

The cruise control system can also be activated while the vehicle 100 is within a selected distance (i.e., d1) from the central line 210 and when the road angle is within a certain angular threshold from the central line 210. A left side angular threshold 214 and a right side angular threshold 216 define an acceptable range for the road wheel angle to be in when activating the cruise control system. In various embodiments, the vehicle can be up to a distance d1 to either side of the center line 210 (as shown in the "on the left" scenario of FIG. 2A and the "on the right" scenario of FIG. 2C) with the road wheel angle being within the left side angular threshold 214 and the right side angular threshold 216.

Referring to the "on the left" driving scenario of FIG. 2A, the vehicle is too far from the central line 210 (i.e., too far to the left) to fit the distance criterion for activating the cruise control system. Referring to the "on the right" driving scenario of FIG. 2C, the vehicle is too far to the right to activate the cruise control system. In addition, the road wheel angle θ between the road wheel trajectory 218 and the longitudinal axis of the vehicle is outside of or greater than the angular threshold. In FIG. 2C a driver attempting to settle the vehicle to within the distance threshold from this position will have to steer the vehicle so that the road wheel angle θ exceeds the angular thresholds. This situation makes it difficult for the drive to place the vehicle in the state at which the cruise control system can be activated.

Figure 3C:
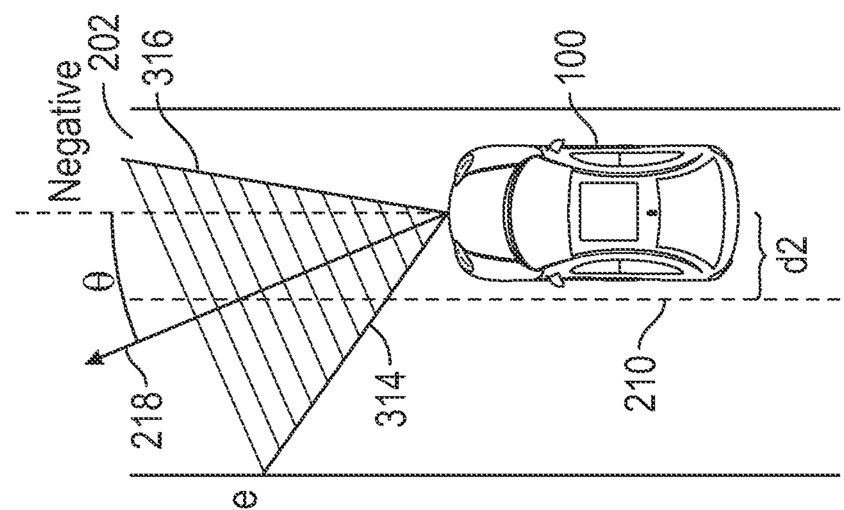
FIGS. 3A-3C illustrate the vehicle at three different locations within a driving lane, the vehicle having flexible angular thresholds for activating the cruise control system of the vehicle.
Figure 3B:
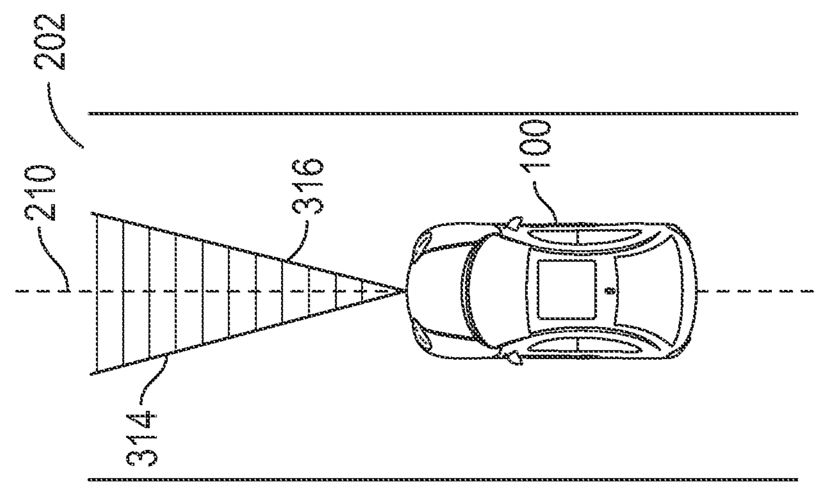
Figure 3A:
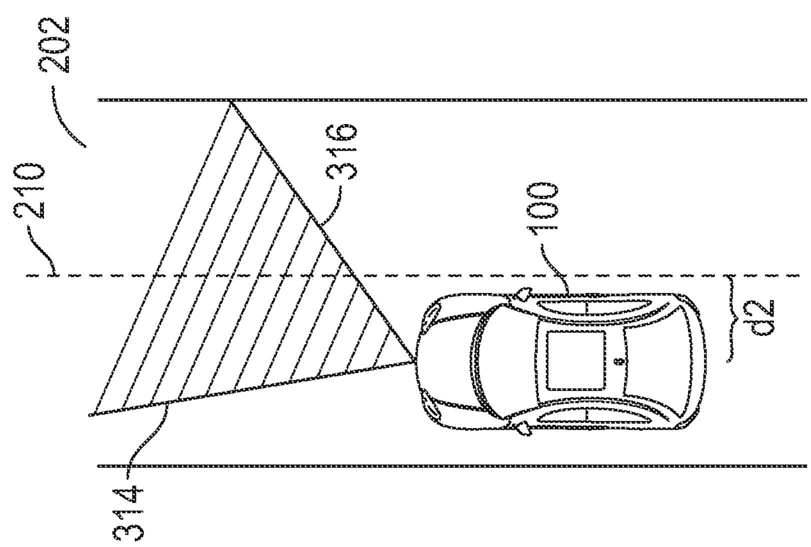

FIGS. 3A, 3B and 3C illustrate the vehicle 100 at three different locations within a driving lane 202, the vehicle having flexible angular thresholds for activating the cruise control system of the vehicle. FIG. 3A illustrates an "on the left" driving scenario in which the vehicle 100 is to a left side of a central line 210 of driving lane 202. FIG. 3B illustrates a centered driving scenario in which the vehicle 100 is driving along the central line 210. FIG. 3C illustrates an "on the right" driving scenario in which the vehicle 100 is to a right side of the central line 210.

Referring first to FIG. 3B, the vehicle 100 is centered along the central line 210 of driving lane 202. The vehicle includes an adjustable left side angular threshold 314 and an adjustable right side angular threshold 316, both of which can change based on the location of the vehicle with respect to the central line 210. Because the vehicle 100 in FIG. 3B is located on the central line 210, the adjustable left side angular threshold 314 and the adjustable right side angular threshold 316 are the same as the left side angular threshold 214 and the right side angular threshold 216 of FIG. 2B.

Referring now to FIG. 3A, the vehicle 100 is located to a left side of the central line 210. At this location, the adjustable right side angular threshold 316 has increased in comparison to the right side angular threshold 216 of FIG. 2A. The adjustable left side angular threshold 314 is the same as left side angular threshold 214 of FIG. 2A. By increasing the adjustable right side angular threshold 316 (i.e., by increasing the angle formed between the adjustable right side angular threshold 316 and the longitudinal axis of the vehicle 10), the driver has more ability to center the vehicle from its current position without having the road wheel angle extend outside of the adjustable right side angular threshold 316, thereby enabling the driver to activate the cruise control system from this position. The angle made by the adjustable right side angular threshold 316 differs from the threshold 216 in direct proportion to the distance that the center of the vehicle is to the left of the central line 210. In various embodiments, the flexibility of the adjustable right side angular threshold 316 allows an increase in the distance threshold (i.e., d2) by which the vehicle can deviate to the left of the central line 210 and still activate the system. Hence d2>d1.

Referring now to FIG. 3C, the vehicle 100 is located to a right side of the central line 210. At this location, the adjustable left side angular threshold 314 has increased in comparison to the left side angular threshold 214 in FIG. 2C. The adjustable right side angular threshold 316 is the same as the right side angular threshold 216 in FIG. 2C. By increasing the adjustable left side angular threshold 314, the driver has more ability to center the vehicle without having the road wheel angle extend outside of the adjustable left side angular threshold 314, thereby enabling the driver to activate the cruise control system from this position. The angle made by the adjustable left side angular threshold 314 differs from the threshold 214 in directly proportion to the distance that the center of the vehicle is to the right of the central line 210. The flexibility of the adjustable left side angular threshold 314 allows an increase in the distance by which the vehicle 100 can deviate to the right of the central line 210 and still activate the system. Hence d2>d1.

Figure 4:
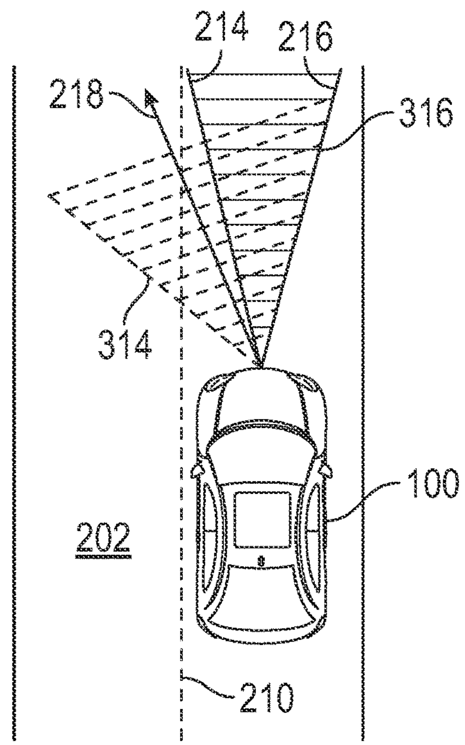
FIG. 4 illustrates differences between the angular thresholds of FIG. 2C and FIG. 3C.

FIG. 4 illustrates differences between the angular thresholds of FIG. 2C and FIG. 3C. FIG. 4 shows FIG. 2C and FIG. 3C overlaid on top of each other. A road wheel trajectory 218 is shown. The road wheel trajectory 218 is outside of the range defined by left side angular threshold 214 and right side angular threshold 216 and would therefor prevent activation of the cruise control system. However, the road wheel trajectory 218 is within of the range defined by adjustable left side angular threshold 314 and adjustable right side angular threshold 316, allowing for activation of the cruise control system when using the adjustable angular thresholds.

Figure 5:
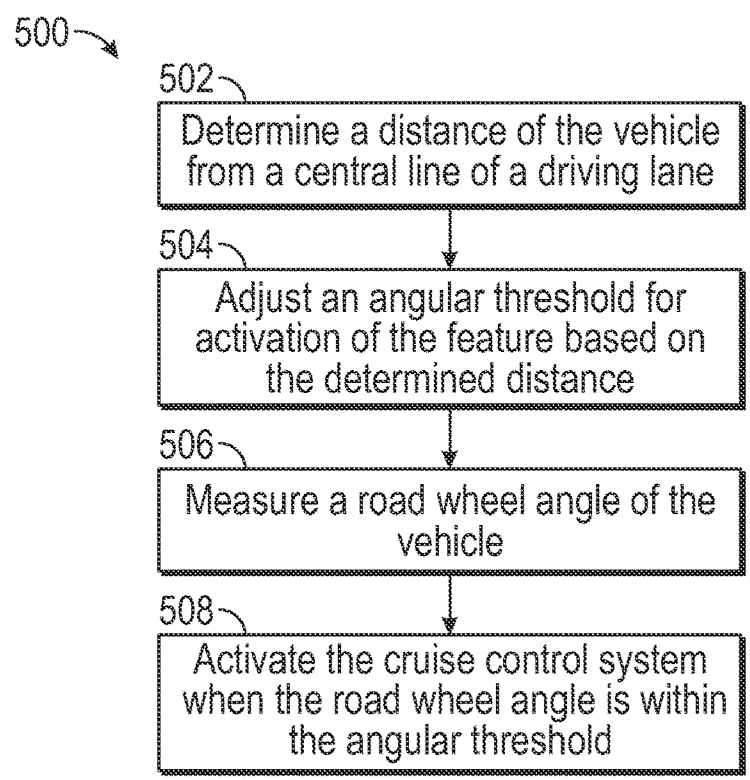
FIG. 5 is a flowchart illustrating a method of activating a cruise control system.

FIG. 5 shows a flowchart 500 illustrating a method of activating a cruise control system of a vehicle. In box 502, a distance of the vehicle from a central line of a driving lane is determined. In box 504, an angular threshold for activation of the cruise control system is adjusted based on the determined distance. In box 506, a road wheel angle of the vehicle is measured. In box 508, the cruise control system is activated when the road wheel angle is within the angular threshold.

Allowing the left side angular threshold 314 and the right side angular threshold 316 to increase with respective perpendicular distances between the longitudinal axis of the vehicle 100 and the central line 210 allows the driver more flexibility to activate the cruise control system at greater distances from the central line 210. In an illustrative embodiment, the limit to the distance to either side of the central line is expanded to 60 cm. for the flexible angular thresholds vs. 42 cm. for the inflexible angular thresholds.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of activating a control system of a vehicle, comprising:

determining, at a processor, a distance of the vehicle from a central line of a driving lane;

adjusting, at the processor, an angular threshold for activation of the control system based on the determined distance;

measuring a road wheel angle of the vehicle using a road wheel angle sensor; and activating, at the processor, the control system when the road wheel angle is within the angular threshold.

2. The method of claim 1, wherein the angular threshold is one of a left side angular threshold and a right side angular threshold.

3. The method of claim 2, wherein adjusting the angular threshold further comprises increasing the one of the left side angular threshold and right side angular threshold that is closest to the central line.

4. The method of claim 2, further comprising increasing the left side angular threshold when the vehicle is to a right side of the central line and increasing the right side angular threshold when the vehicle is to a left side of the central line.

5. The method of claim 1, further comprising increasing the angular threshold in proportion to a distance of the vehicle from the central line.

6. The method of claim 1, wherein the road wheel angle is related to a trajectory of the vehicle.

7. The method of claim 1, wherein the control system is a cruise control system of the vehicle.

8. A system for operating a vehicle, comprising:
- a sensor for detecting lane markings of a driving lane;
- a road wheel angle sensor configured to measure a road wheel angle of the vehicle;
- a processor configured to:
  - determine a distance of the vehicle from a central line of a driving lane from the detected lane markings;
  - adjust an angular threshold for activation of a control system of the vehicle based on the determined distance; and
  - activate the control system when the road wheel angle is within the angular threshold.

9. The system of claim 8, wherein the angular threshold is one of a left side angular threshold and a right side angular threshold.

10. The system of claim 9, wherein the processor is further configured to adjust the angular threshold by increasing the one of the left side angular threshold and right side angular threshold that is closest to the central line.

11. The system of claim 9, wherein the processor is further configured to increase the left side angular threshold when the vehicle is to a right side of the central line and increasing the right side angular threshold when the vehicle is to a left side of the central line.

12. The system of claim 8, wherein the processor is further configured to increase the angular threshold in proportion to a distance of the vehicle from the central line.

13. The system of claim 8, wherein the road wheel angle is related to a trajectory of the vehicle.

14. The system of claim 8, wherein the control system is a cruise control system of the vehicle.

15. A vehicle, comprising:
- a sensor for detecting lane markings of a driving lane;
- a road wheel angle sensor configured to measure a road wheel angle of the vehicle;
- a cruise control system;
- a processor configured to:
  - determine a distance of the vehicle from a central line of a driving lane from the detected lane markings;
  - adjust an angular threshold for activating the cruise control system based on the determined distance; and
  - activate the cruise control system when the road wheel angle is within the angular threshold.

16. The vehicle of claim 15, wherein the angular threshold is one of a left side angular threshold and a right side angular threshold.

17. The vehicle of claim 16, wherein the processor is further configured to adjust the angular threshold by increasing the one of the left side angular threshold and right side angular threshold that is closest to the central line.

18. The vehicle of claim 16, wherein the processor is further configured to increase the left side angular threshold when the vehicle is to a right side of the central line and increasing the right side angular threshold when the vehicle is to a left side of the central line.

19. The vehicle of claim 15, wherein the processor is further configured to increase the angular threshold in proportion to a distance of the vehicle from the central line.

20. The vehicle of claim 15, wherein the road wheel angle is related to a trajectory of the vehicle.

* * * * *